US011478974B2

(12) United States Patent
Hidaka

(10) Patent No.: US 11,478,974 B2
(45) Date of Patent: Oct. 25, 2022

(54) BLOW MOLDING MACHINE AND METHOD FOR CONTROLLING BLOW MOLDING MACHINE

(71) Applicant: NISSEI ASB MACHINE CO., LTD., Nagano (JP)

(72) Inventor: Yasuhiro Hidaka, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 17/280,518

(22) PCT Filed: Sep. 17, 2019

(86) PCT No.: PCT/JP2019/036387
§ 371 (c)(1),
(2) Date: Mar. 26, 2021

(87) PCT Pub. No.: WO2020/066749
PCT Pub. Date: Apr. 2, 2020

(65) Prior Publication Data
US 2022/0040900 A1    Feb. 10, 2022

(30) Foreign Application Priority Data
Sep. 28, 2018    (JP) .............................. JP2018-185053

(51) Int. Cl.
*B29C 49/42*    (2006.01)
*B29C 49/28*    (2006.01)
(Continued)

(52) U.S. Cl.
CPC .......... *B29C 49/4205* (2013.01); *B29C 49/06* (2013.01); *B29C 49/28* (2013.01); *B29C 49/4236* (2013.01); *B29C 49/78* (2013.01)

(58) Field of Classification Search
CPC . B29C 49/4236; B29C 49/4205; B29C 49/28; B29C 49/56; B29C 49/6427; B29C 49/6409
See application file for complete search history.

(56) References Cited

U.S. PATENT DOCUMENTS

| 2004/0158335 | A1   | 8/2004  | Fujibayashi et al. |
| 2008/0260888 | A1 * | 10/2008 | Freire-Diaz ............. B29C 49/56 |
|              |      |         | 425/541 |

(Continued)

FOREIGN PATENT DOCUMENTS

| DE | 10212896 A1 * | 10/2003 | ............. B29C 49/30 |
| JP | 2004-246498 A | 9/2004  | |

(Continued)

OTHER PUBLICATIONS

Google patents translation of DE 102 12 896 A1 dated Oct. 2003. (Year: 2003).*

(Continued)

*Primary Examiner* — Robert B Davis
(74) *Attorney, Agent, or Firm* — Greenblum & Bernstein, P.L.C.

(57) ABSTRACT

A blow molding machine for a resin container is provided with at least a blow molding section, a heating section, and a conveyance path for conveying a preform heated by the heating section to the blow molding section. The conveyance path is provided with a first conveyance member that is continuously and intermittently driven. The blow molding section is provided with a plurality of blow movable members. A plurality of conveyance driving sections for driving the first conveyance member are driven in synchronization with each other, and the blow movable members are driven in synchronization with each other.

11 Claims, 12 Drawing Sheets

(51) Int. Cl.
  *B29C 49/64* (2006.01)
  *B29C 49/06* (2006.01)
  *B29C 49/78* (2006.01)

(56) References Cited

U.S. PATENT DOCUMENTS

| | | |
|---|---|---|
| 2012/0294974 A1 | 11/2012 | Yokobayashi et al. |
| 2013/0236589 A1 | 9/2013 | Yamaguchi et al. |
| 2014/0099396 A1 | 4/2014 | Yokobayashi et al. |
| 2014/0302191 A1 | 10/2014 | Yamaguchi et al. |
| 2015/0328817 A1 | 11/2015 | Yamaguchi et al. |

FOREIGN PATENT DOCUMENTS

| | | |
|---|---|---|
| JP | 2011-156728 A | 8/2011 |
| JP | 5563095 B2 | 7/2014 |
| WO | 2012/057016 A1 | 5/2012 |

OTHER PUBLICATIONS

International Search Report issued in International Patent Application No. PCT/JP2019/036387, dated Dec. 17, 2019, along with an English translation thereof.
Written Opinion of the International Searching Authority issued in International Application No. PCT/JP2019/036387, dated Dec. 17, 2019, along with an English translation thereof.

\* cited by examiner

BLOW MOLDING MACHINE AND METHOD FOR CONTROLLING BLOW MOLDING MACHINE

TECHNICAL FIELD

The present invention relates to a blow molding machine and a method for controlling the blow molding machine.

BACKGROUND ART

PTL 1 discloses a 1.5-stage type injection stretch blowing molding apparatus in which the number of simultaneous injection moldings and the number of simultaneous blowing moldings are not equal.

CITATION LIST

Patent Literature

PTL 1: Japanese Patent Gazette No. 5,563,095

SUMMARY OF INVENTION

Technical Problem

A 1.5-step type blow molding machine, in which containers of various sizes can be manufactured from materials by a single machine and the number of containers taken (the number of simultaneous moldings) can be changed, has been put on the market. As a result of pursuing improvements in productivity and versatility in space-saving, this model includes a large number of movable members and dedicated mechanically controlled driving parts for driving these movable members (a method using a mechanical cam, a cam clutch, a timing belt, for example).

In recent years, there is a demand for improving the matters related to expansion of versatility and improvement in productivity in order to enhance the market competitiveness of this model. However, when the mechanical control method is adopted as in the prior art, works involved in adjusting an equipment and replacing mechanical parts increase, which increases the burden on an operator. Further, in order to achieve the above improvements, it is essential to control the operation of the movable parts more precisely and stably, and such control has been difficult with a mechanical control method.

An object of the present invention is to provide a blow molding machine and a control method for the blow molding machine capable of achieving a short molding cycle and easily manufacturing containers having various sizes.

Solution to Problem

A blow molding machine according to one aspect of the present invention capable of solving the above problems is a blow molding machine for a resin container that includes at least a blow molding section, a heating section, and a conveyance path for conveying a preform heated in the heating section to the blow molding section, in which the conveyance path includes:
a conveyance movable member configured to continuously and intermittently be driven,
a plurality of conveyance driving units configured to drive the conveyance movable member, and
a first driving unit group,
the blow molding section includes:
a plurality of blow movable members, and
a second driving unit group,
the plurality of conveyance driving units in the conveyance path are driven in synchronization with each other by the first driving unit group, and
the blow movable members in the blow molding section are driven in synchronization with each other by the second driving unit group.

Further, in the blow molding machine, it is preferable that the first driving unit group and the second driving unit group each include a plurality of servomotors,
the first driving unit group is configured to be controlled by an electronic cam synchronized with a first virtual axis, and
the second driving unit group is configured to be controlled by an electronic cam synchronized with a second virtual axis.

According to the blow molding machine having this configuration, the operations of the conveyance driving unit and the blow movable member each are controlled by the electronic cam, so that the operation of the movable member can be easily optimized to be stable and shortest.

Further, in the blow molding machine, it is preferable that the conveyance movable member is a first conveyance member configured to support the preform,
the conveyance driving unit includes at least:
a first conveyance driving unit configured to continuously drive the first conveyance member, and
a second conveyance driving unit and a third conveyance driving unit configured to intermittently drive the first conveyance member,
the first conveyance member in the conveyance path is configured to be driven and conveyed by the first conveyance driving unit, the second conveyance driving unit and the third conveyance driving unit in this order, and
the first conveyance driving unit, the second conveyance driving unit and the third conveyance driving unit are configured to be controlled in synchronization with each other.

According to the blow molding machine having this configuration, the operation of the first conveyance member can be easily optimized. Specifically, the vibration due to the operation of the first conveyance member can be reduced, and the collision of the first conveyance members can be prevented. Further, an initial operation (operation of returning the phase of each driving unit to an initial state), which is difficult when using a mechanical control method, becomes easy. In this way, a stable operation can be achieved, and the mechanical load can be reduced.

Further, in the blow molding machine, it is preferable that the second conveyance driving unit and the third conveyance driving unit each are configured to be driven to maintain continuity of speed.

According to the blow molding machine having this configuration, the driven first conveyance member is smoothly conveyed on the conveyance path without suddenly stopping or suddenly starting, and the vibration due to the operation of the first conveyance member and the collision between the first conveyance members can be prevented. In this way, a stable operation can be achieved, and the mechanical load can be also reduced.

Further, in the blow molding machine, it is preferable that the second conveyance driving unit is configured to initially drive the first conveyance member in a state of being driven at the same speed as a driving speed of the first conveyance driving unit, and then, to be accelerated to drive the first conveyance member to be accelerated.

Further, in the blow molding machine, it is preferable that the third conveyance driving unit is configured to be driven after the second conveyance driving unit is accelerated from a fixed driving speed, configured to be driven at the same speed as a driving speed of the second conveyance driving unit from a time when a driving speed of the third conveyance driving unit is accelerated to the driving speed of the second conveyance driving unit, and configured to be driven to stop at a time when the driving speed of the second conveyance driving unit becomes zero.

Further, in the blow molding machine, it is preferable that the blow movable members comprise at least a blow cavity mold that is a split mold, a bottom mold, and a second conveyance member for conveying the preform and the container, and an opening and closing operation of the blow cavity mold and a conveyance operation of the second conveyance member are configured to be controlled in synchronization with each other.

According to the blow molding machine having this configuration, the operations of the blow cavity mold, the bottom mold and the second conveyance member can be easily optimized. Specifically, the time required for the opening and closing operation of the blow cavity mold can be shortened, and vibration and noise can be reduced. In this way, a stable operation can be achieved, and the mechanical load can be reduced.

Further, in the blow molding machine, it is preferable that during a first conveyance operation of conveying the preform to the blow cavity mold by the second conveyance member, a first opening and closing operation of closing the blow cavity mold is performed.

Further, in the blow molding machine, it is preferable that during a second opening and closing operation of opening the blow cavity mold, a second conveyance operation of conveying the container from the blow cavity mold to an outside of the blow cavity mold by the second conveyance member is performed.

According to the blow molding machine having this configuration, the cycle time of the blow molding can be shortened. Furthermore, in a certain cycle time when a certain number of preforms are conveyed to the blow molding section, the moving speed of the second conveyance member alone can be made slower as compared with the case where the blow cavity mold and second conveyance member are independently moved. Since the operation of the second conveyance member, which is one of the blow movable members, can be slowed down even during a short cycle time, a stable operation can be achieved while shortening the molding cycle, and the mechanical load can be also reduced.

Further, a method for controlling a blow molding machine according to one aspect of the present invention capable of solving the above problems is a method for controlling a blow molding machine for a resin container that includes at least a blow molding section, a heating section, and a conveyance path for conveying a preform heated in the heating section to the blow molding section, and the method includes:

controlling a plurality of conveyance driving units in synchronization with each other the conveyance driving units being configured to drive a conveyance movable member in the conveyance path, and controlling a plurality of blow driving units in synchronization with each other, the blow driving units being configured to drive a plurality of blow movable members in the blow molding section.

Further, a method for controlling a blow molding machine according to one aspect of the present invention capable of solving the above problems is a method for controlling a blow molding machine for a resin container that includes at least a blow molding section, a heating section, a conveyance path for conveying a preform heated in the heating section to the blow molding section, and a driving unit, in which the conveyance path is formed in a loop shape having a continuous conveyance region and an intermittent conveyance region, and includes a plurality of conveyance movable members, the conveyance movable member is a first conveyance member configured to be able to support the preform, the driving unit includes at least a first conveyance driving unit provided in the continuous conveyance region and continuously driving the first conveyance member, and a second conveyance driving unit and a third conveyance driving unit provided in the intermittent conveyance region and intermittently driving the first conveyance member, a transfer section for transferring the preform mounted in the first conveyance member that is stopped to the blow molding section is provided in the conveyance path between the second conveyance driving unit and the third conveyance driving unit, and the method includes:

driving the second conveyance driving unit and the third conveyance driving unit at least in synchronization with each other, moving at least the first conveyance member on the upstream side with respect to the first conveyance member on the downstream side which is stopped in the transfer section to reduce a distance between the first conveyance member on the upstream side and the first conveyance member on the downstream side, and moving the first conveyance member on the downstream side before the first conveyance member on the upstream side and the first conveyance member on the downstream side come into contact with each other to maintain the distance between the first conveyance member on the upstream side and the first conveyance member on the downstream side.

Further, a method for controlling a blow molding machine according to one aspect of the present invention capable of solving the above problems is a method for controlling a blow molding machine for a resin container that includes at least a blow molding section, a heating section, a conveyance path for conveying a preform heated in the heating section to the blow molding section, and a driving unit, in which the blow molding section includes a plurality of blow movable members, the blow movable members comprise at least a blow cavity mold that is a split mold, a bottom mold, and a second conveyance member for conveying the preform and the container, the driving unit includes a first blow driving unit opening and closing the blow cavity mold, a second blow driving unit raising and lowering the bottom mold, and a third blow driving unit moving the second conveyance member, and the method includes:

driving at least the first blow driving unit, the second blow driving unit, and the third blow driving unit in synchronization with each other, and performing an opening and closing operation of closing the blow cavity mold during a conveyance operation of conveying the preform to the blow cavity mold by the second conveyance member.

Advantageous Effects of Invention

According to the present invention, it is possible to provide a blow molding machine and a control method for the blow molding machine capable of achieving a short molding cycle and easily manufacture containers having various sizes.

DESCRIPTION OF EMBODIMENTS

Hereinafter, embodiments of the present invention will be described with reference to the drawings. Here, the dimensions of respective members shown in these drawings may be different from the actual dimensions of respective members for convenience of explanation.

Further, in the description of the present embodiment, for convenience of explanation, "a left and right direction", "a front and rear direction", and "an upper and lower direction" are referred as appropriate. These directions are relative directions set for a blow molding machine shown in FIGS. 1 and 2. Here, "the upper and lower direction" is a direction including "an upward direction" and "a downward direction". The "front and rear direction" is a direction including "a forward direction" and "a rearward direction". The "left and right direction" is a direction including "a leftward direction" and "a rightward direction".

Figure 1:
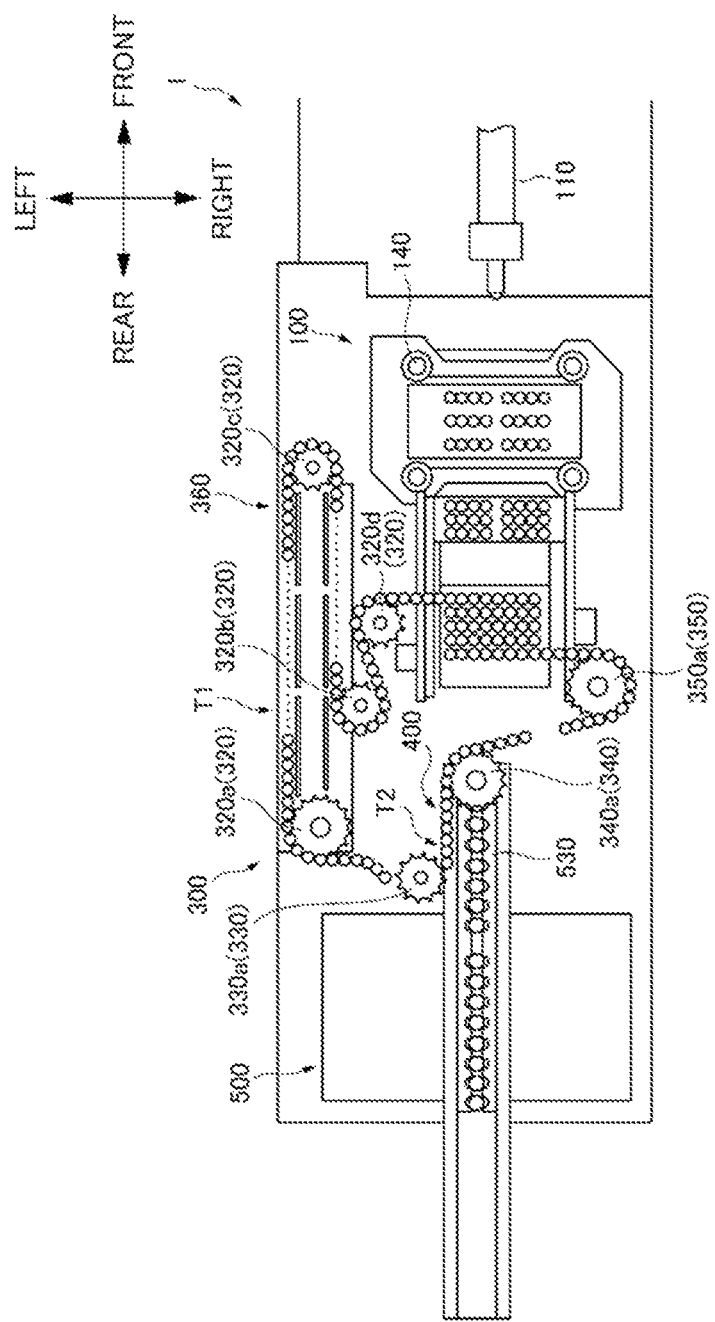
FIG. 1 is a schematic plan view showing the entire of a blow molding machine.
Figure 2:
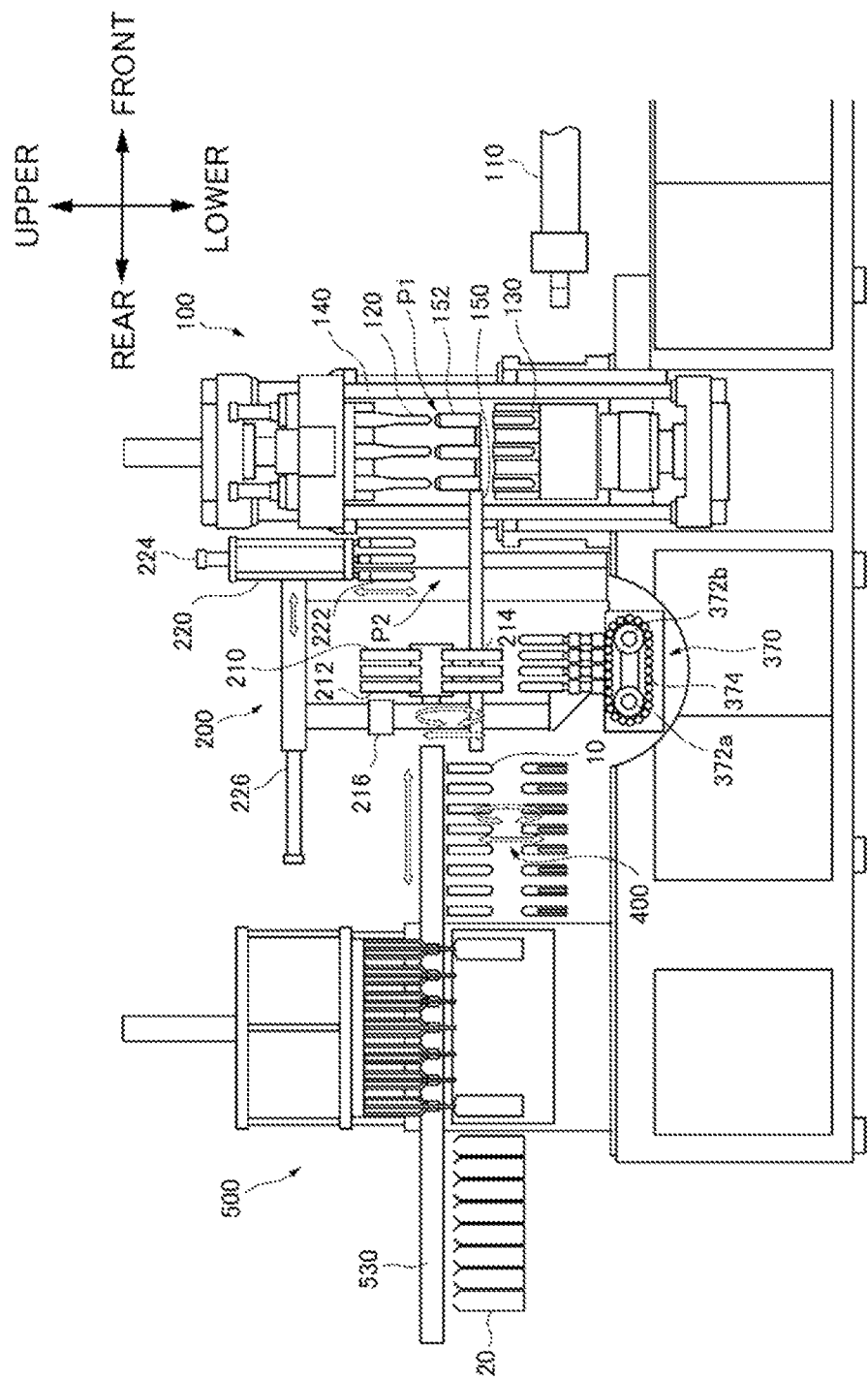
FIG. 2 is a schematic side view showing the entire of the blow molding machine.

FIG. 1 is a schematic plan view showing the entire state of a blow molding machine 1 for a resin container 20 according to the present embodiment. FIG. 2 is a schematic side view showing the entire state of the blow molding machine 1 according to the present embodiment. The blow molding machine 1 includes an injection molding section 100 that molds a resin preform 10, a blow molding section 500 that blow-molds the preform 10 to form a container, and a conveyance path 300 for conveying the preform 10 molded in the injection molding section 100 to the blow molding section 500. The blow molding machine 1 is a hot parison type (1.5-stage type) blow molding machine in which N preforms 10 that are simultaneously injection-molded are blow-molded by M in n times.

Here, the injection molding section 100 will be described with reference to FIGS. 1 and 2. As shown in FIGS. 1 and 2, the injection molding section 100 is configured to allow N preforms 10 to be simultaneously injection-molded by M (M=N/n: M is a natural number) in each of n rows (n is an integer of two or more) parallel to the left and right direction. The injection molding section 100 includes an injection device 110 that injects resin, an injection core mold 120, an injection neck mold (not shown), an injection cavity mold 130, and a mold clamping mechanism that drives the clamping of the molds along four tie bars 140.

As shown in FIG. 1, the maximum number N of the preforms that are simultaneously injection-molded in the injection molding section 100 is, for example, 24 (3 rows×8 preforms). When the diameter of the preform is large, 4 perform arrays are used in each row and the total number N is 12 in 3 rows.

The injection molding section 100 includes a take-out device 150 that takes out the N injection-molded preforms 10. In the take-out device 150, N (e.g., 3 rows×8 preforms) holding members 152 (e.g., pots) can be horizontally moved to a receiving position P1 below the injection core mold 120 and a delivery position P2 outside a space surrounded by the tie bars 140.

Here, for the injection molding section including the take-out device, for example, the technology of a preform molding device disclosed in Japanese Patent Gazette No. 4,148,576 by the applicant of the present invention can be used. However, the injection molding section 100 of the present embodiment is not limited to this.

The blow molding machine 1 includes a first reversing section 200 for delivering the preform 10 from the injection molding section 100 to the conveyance path 300 (FIG. 2). The first reversing section 200 is configured to reverse the preform 10 in an upright state molded in the injection molding section 100 into an inverted state with a neck portion 12 facing downward and deliver the preform 10 to the conveyance path 300. The first reversing section 200 includes a first reversing member 210, and a preform conveying device 220 for conveying the preform 10 from the take-out device 150 of the injection molding section 100 to the first reversing member 210.

The preform conveying device 220 conveys the N preforms 10 held by the three rows of holding members 152 at the delivery position P2 shown in FIG. 2 to the first reversing member 210. The preform conveying device 220 includes a preform holder 222, a first conveyance mechanism 224 that raises and lowers the preform holder 222 in the upper and lower direction, and a second conveyance mechanism 226 that horizontally moves the preform holder 222 and the first conveyance mechanism 224 in the front and rear direction. For example, an air cylinder or a servomotor is used as a drive source for the first and second conveyance mechanisms 224, 226.

The first reversing member 210 includes N first reversing pots 212 and N second reversing pots 214 facing the first reversing pots 212. The first reversing pots 212 and the second reversing pots 214 (i.e., the first reversing member 210) can be intermittently reversed by 180° around an axis.

The first reversing member 210 can be raised and lowered by a ball screw or the like driven by a drive source 216 (e.g., servomotor).

Figure 3:
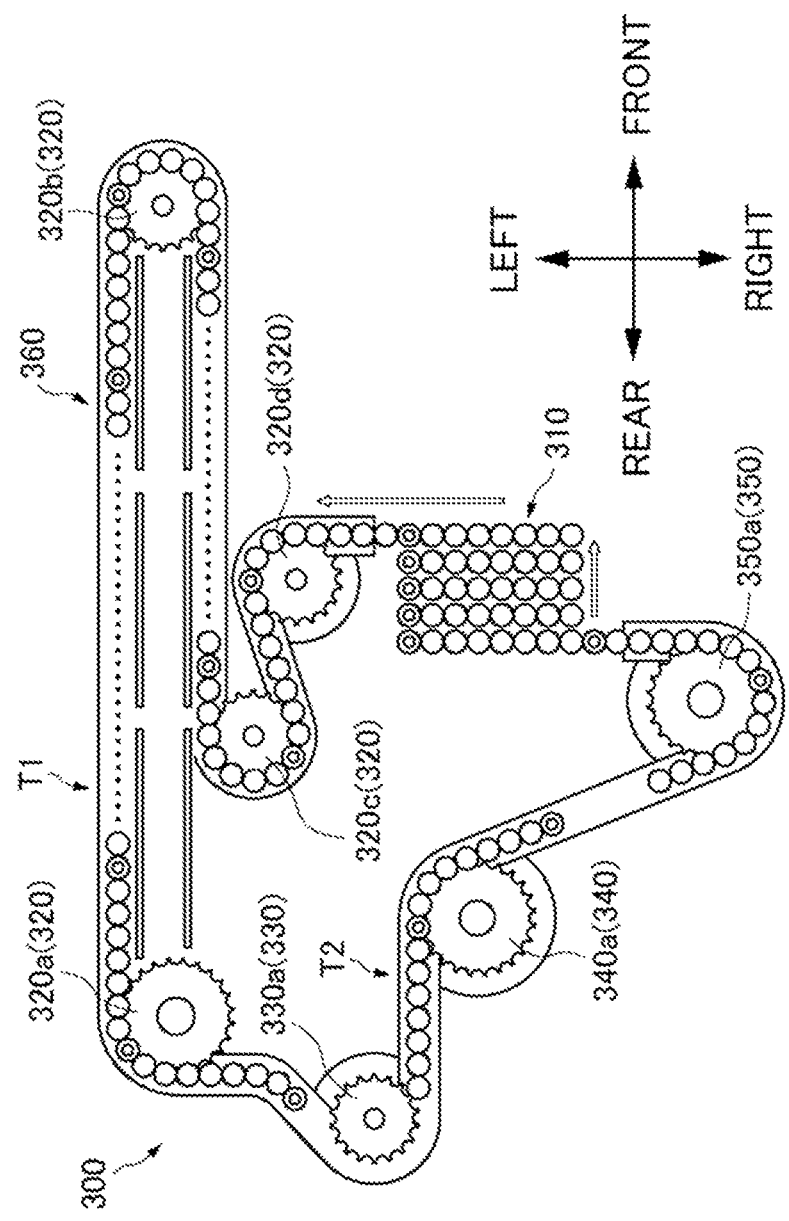
FIG. 3 is a plan view of a conveyance path.

The conveyance path 300 is configured to convey the preform 10 conveyed from the injection molding section 100 via the first reversing section 200 to the blow molding section 500. Here, the conveyance path 300 will be described with reference to FIGS. 3 to 6. FIG. 3 is a plan view of the conveyance path 300. The conveyance path 300 includes a plurality of first conveyance members 310 (an example of the conveyance movable member) configured to support the preform 10. The conveyance path 300 is formed in a loop shape and configured to convey the first conveyance member 310 in a circulation manner. The conveyance path 300 includes a plurality of sprockets 320a, 320b, 320c, 320d serving as a first conveyance driving unit 320 that continuously drives the first conveyance member 310, a sprocket 330a serving as a second conveyance driving unit 330 that intermittently drives the first conveyance member 310, a sprocket 340a serving as a third conveyance driving unit 340 that intermittently drives the first conveyance member 310, and a sprocket 350a serving as a fourth conveyance driving unit 350 that intermittently drives the first conveyance member 310. The conveyance path 300 includes a guide rail 302 (see FIG. 4) that guides the plurality of first conveyance members 310 along a conveyance direction H (see FIG. 5). In the conveyance direction H, the first conveyance driving unit 320 is arranged on the most upstream side, and the second conveyance driving unit 330, the third conveyance driving unit 340 and the fourth conveyance driving unit 350 are arranged on the downstream side in this order.

The region in which the first conveyance member 310 is continuously conveyed by the first conveyance member 310 is a continuous conveyance region T1, and the region in which the first conveyance member 310 is intermittently conveyed by the second conveyance driving unit 330, the third conveyance driving unit 340, and the fourth conveyance driving unit 350 is an intermittent conveyance region T2. A heating section 360 that heats the temperature of the preform 10 to a temperature suitable for blow molding is provided in the continuous conveyance region T1. The heating section 360 can be configured by arranging heaters (e.g., quartz heaters) and reflectors arranged in multiple stages in a height direction and at intervals in the conveyance direction H on both sides of the conveyance path 300 in the continuous conveyance region T1. Inside the heating section 360, hot air may be blown from the back side of the heater. The hot air can be guided in the heating section 360 along the conveyance direction H of the preform 10.

Figure 4:
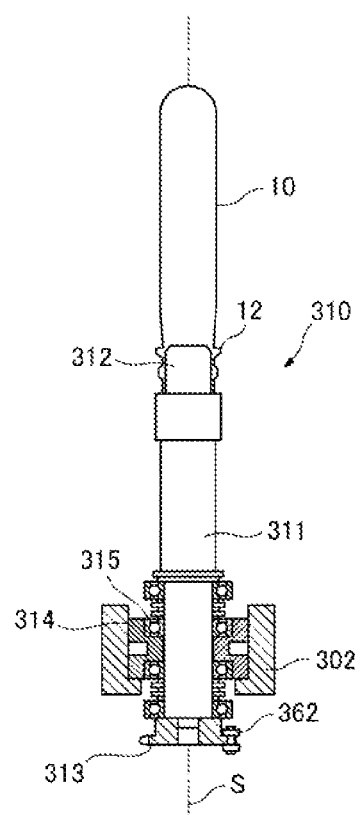
FIG. 4 is a view showing a conveyance member.
Figure 5:
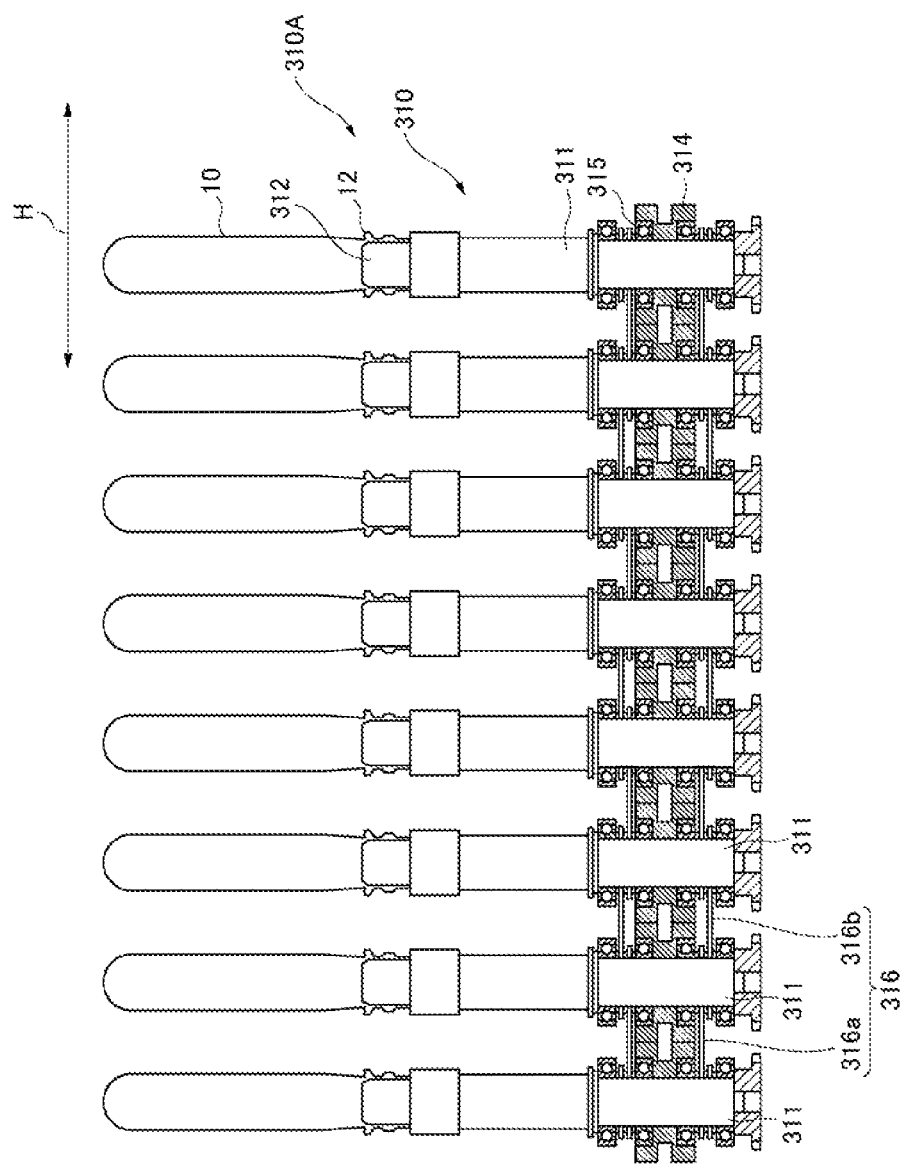
FIG. 5 is a view showing a set of conveyance members.

FIG. 4 is a view showing the first conveyance member 310, and FIG. 5 is a view showing a set of first conveyance members 310. The first conveyance member 310 is a member that includes a main body portion 311 extending with respect to a rotation axis S. A holding portion 312 inserted into the neck portion 12 of the preform 10 is fixed to one end portion (upper end portion) of the main body portion 311 in an extending direction of the rotation axis S. A sprocket 313 to which a rotation driving force is applied is fixed to the other end portion (lower end portion) of the main body portion 311 in the extending direction of the rotation axis S. The sprocket 313 engages with a fixed or movable chain 362 arranged in the heating section 360 and rotates about the rotation axis S.

As shown in FIG. 5, the two first conveyance members 310 that are adjacent to each other in the conveyance direction H each have a ring-shaped member 314, the ring-shaped members 314 being in contact with each other. The ring-shaped member 314 is supported on the main body portion 311 via a rotation bearing 315. An outer circumference of the ring-shaped member 314 is, for example, circular, and the adjacent ring-shaped members 314 can be rolled in a state of being in contact with each other. In this way, the rolling-contact relationship of the adjacent ring-shaped members 314 can be maintained even in the curved portion of the conveyance path 300.

As shown in FIG. 5, the M (e.g., M=8) first conveyance members 310 continuous in the conveyance direction H are connected by a connecting member 316 to form one conveyance jig 310A (a set of first conveyance members 310). The connecting member 316 includes an inner link 316a that connects the main body portion 311 of one first conveyance member 310 with the main body portion 311 of another first conveyance member 310 adjacent thereto on the upstream side, for example, and an outer link 316b that connects the main body portion 311 of the one first conveyance member 310 with the main body portion 311 of another first conveyance member 310 adjacent thereto on the downstream side, for example. The connecting member 316, which is a chain of the inner link 316a and the outer link 316b, forms a chain. This chain engages with the plurality of sprockets 320a, 320b, 320c, 320d, 330a, 340a, 350a shown in FIGS. 1 and 3.

When the conveyance jig 310A is formed by connecting the M first conveyance members 310 as shown in FIG. 5, for the specifications in which the number M of simultaneous blow moldings is different, the conveyance jig 310A is prepared according the number M. On the contrary, when the unconnected first conveyance member 310 are used, it becomes easy to respond to the changes in the number M of simultaneous blow moldings. However, when the individual first conveyance members 310 are used without being connected, it is necessary to provide the individual first conveyance members 310 with a member corresponding to a chain that engages with a continuous/intermittent drive member such as a sprocket.

Here, in FIG. 3, the position of the leading first conveyance member 310 (or the preform 10) of one conveyance jig 310A is marked to distinguish it with the other seven ones other than the leading one.

Figure 6:
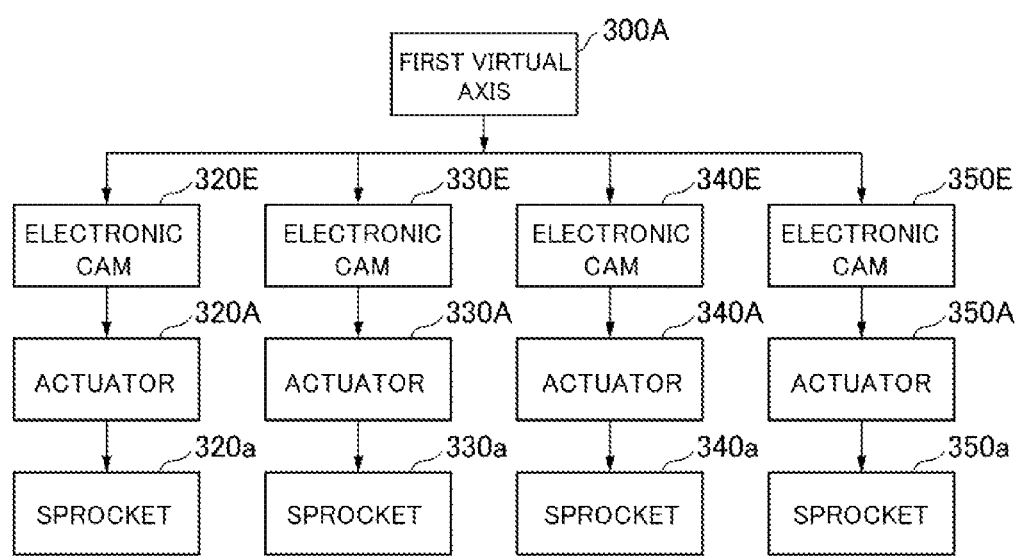
FIG. 6 is a block diagram illustrating electronic cams set in a first driving unit group for driving a plurality of sprockets provided in the conveyance path.

FIG. 6 is a block diagram illustrating electronic cams set in a first driving unit group that drives a plurality of sprockets (conveyance driving unit) provided in the conveyance path 300. The sprockets 320a, 330a, 340a, 350a are driven by actuators 320A, 330A, 340A, 350A (first driving unit group), respectively. The actuators 320A, 330A, 340A, 350A are, for example, servomotors. Electronic cams 320E, 330E, 340E, 350E are respectively set for the actuators 320A, 330A, 340A, 350A. Each electronic cam is synchronized with a first virtual axis 300A. The operations of the respective actuators 320A, 330A, 340A, 350A are controlled in synchronization with the first virtual axis 300A by the respective electronic cams. In this way, the operations of the first conveyance driving unit 320 to the fourth conveyance driving unit 350 are controlled in synchronization with the first virtual axis 300A.

In the first conveyance driving unit 320 that is continuously driven, one (sprocket 320a) of the plurality of sprockets 320a, 320b, 320c, 320d shown in FIG. 3 is controlled by the electronic cam 320E, and the remaining sprockets 320b, 320c, 320d are mechanically synchronized with the sprocket 320a by a timing belt or the like. Alternatively, some of the remaining sprockets 320b, 320c, 320d may be configured to be driven by a driving force acting on the conveyance jig 310A on the upstream side without being mechanically synchronized.

Further, the second conveyance driving unit 330, the third conveyance driving unit 340, and the fourth conveyance driving unit 350, which are intermittently driven, are controlled to maintain continuity of speed. Maintaining the continuity of speed means that the second conveyance driving unit, the third conveyance driving unit, and the fourth conveyance driving unit, which are intermittently driven, do not operate due to pulsed speed changes, but the state in which the driving speed becomes continuous due to moderate acceleration and deceleration is maintained.

Here, returning to FIGS. 1 and 2, the blow molding machine 1 will be described. A second reversing section 400 (an example of the transfer section that transfers the preform 10 from the conveyance path 300 to the blow molding section 500) that reverses the preform 10 conveyed in the conveyance path 300 from the upright state to the inverted state and delivers the preform 10 to the blow molding section 500 is provided between the second conveyance driving unit 330 and the third conveyance driving unit 340 in the intermittent conveyance region T2. The second reversing section 400 includes a second reversing member (not shown) that delivers the preform 10 stationary in the conveyance path 300 between the second conveyance driving unit 330 and the third conveyance driving unit 340 to a second conveyance member 530 (to be described later) provided in the blow molding section 500.

Further, a parallel driving device 370 that drives (n+1) or more, for example, four (four rows of) conveyance jigs 310A in parallel is arranged at a position of the conveyance path 300 below the first reversing section 200 (FIG. 2). The parallel driving device 370 is configured by attaching both ends of a plurality of conveyance rails to two chains 374, each chain 374 being hung on two sprockets 372a, 372b at left and right end portions. When one of the sprockets 372a, 372b is rotated by one step, the conveyance rails are transferred by one step. The leading row of the four rows of conveyance jigs 310A arranged in the parallel driving device 370 is configured to be pushed out to the left by a carry-out device (not shown) including, for example, an air cylinder or the like. In this way, the eight first conveyance members 310 (the conveyance jigs 310A) on which the preforms 10 are mounted are continuously conveyed by being sequentially engaged with the sprocket 320d that is continuously driven.

The leading first conveyance member 310 of the leading row of conveyance jig 310A is carried out by the carry-out device and engaged with the most upstream sprocket 320d, so that a continuous conveyance force is applied from the sprocket 320d to the conveyance jig 310A. When a driving force is applied to each conveyance jig 310A (the first conveyance members 310) that engages with the four continuously driven sprockets 320a, 320b, 320c, 320d existing in the continuous conveyance region T1, another conveyance jig 310A (the first conveyance members 310) that does not engage with the continuously driven sprocket on the upstream side thereof is pushed, and the plurality of conveyance jigs 310A are continuously conveyed along the conveyance direction H in the continuous conveyance region T1.

Figure 7:
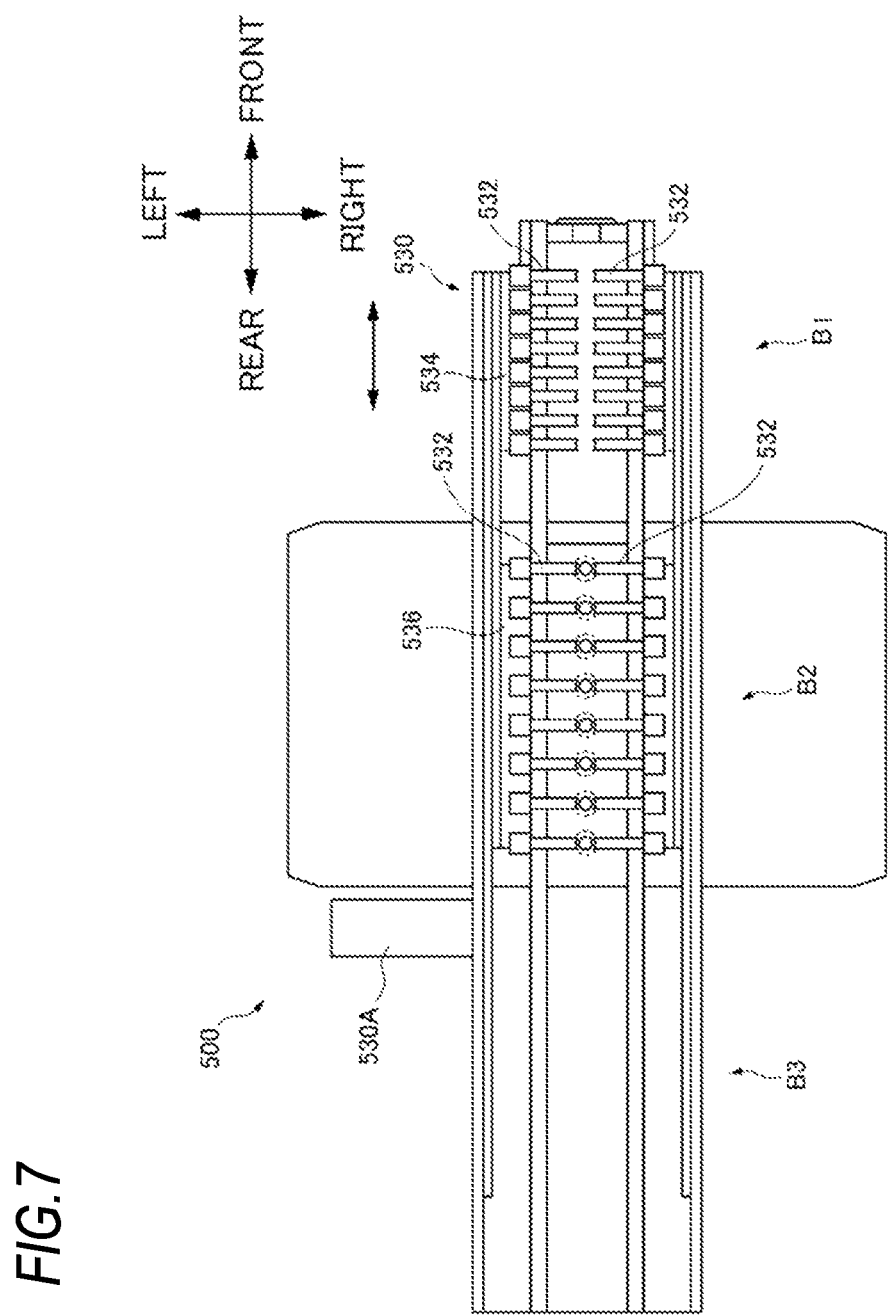
FIG. 7 is a schematic plan view of a blow molding section.
Figure 8:
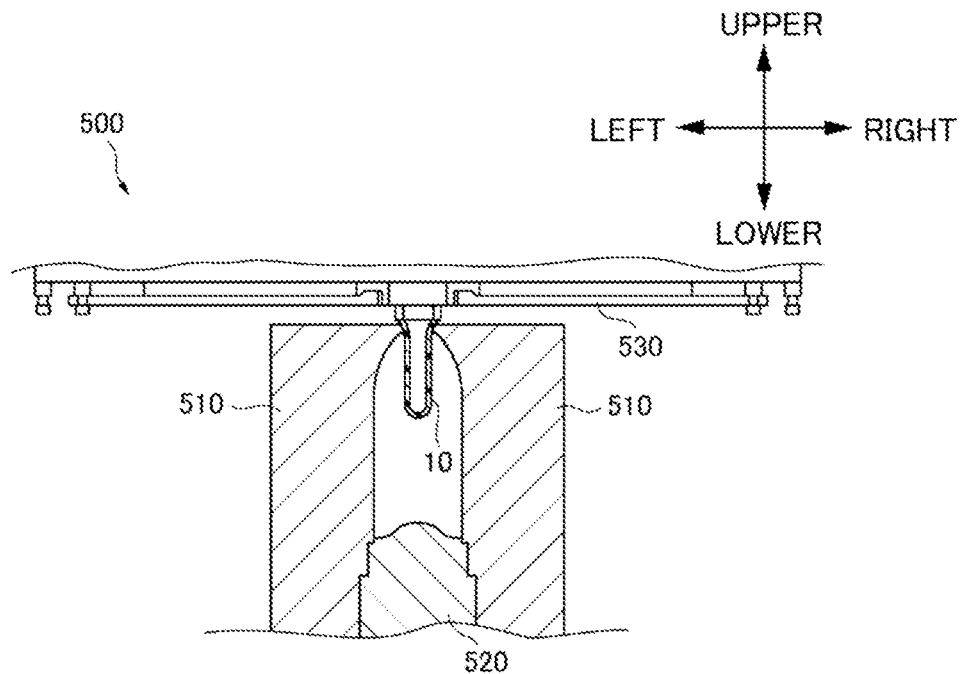
FIG. 8 is a view showing an outline of a partial cross section of the blow molding section in a side view.

The blow molding section 500 is configured to form containers by biaxially stretching M preforms 10 using a blowing air and a vertical-axis driving of a stretching rod. Here, the blow molding section 500 will be described with reference to FIGS. 7 to 9. FIG. 7 is a schematic plan view of the blow molding section 500, and FIG. 8 is a view showing an outline of a partial cross section of the blow molding section 500 in a side view. The blow molding section 500 includes a blow cavity mold 510 that is a split mold, is openable in the left and right direction and defines the shape of a body portion of the container 20, a liftable bottom mold 520 that defines a bottom portion of the container 20, and the second conveyance member 530 for conveying the preform 10 and the container 20 in the front and rear direction. Although the blow molding section 500 may further include a stretch rod, a blow core mold, a neck mold, and the like, a well-known configuration can be applied to these components, and detailed description thereof will be omitted herein.

Figure 9:
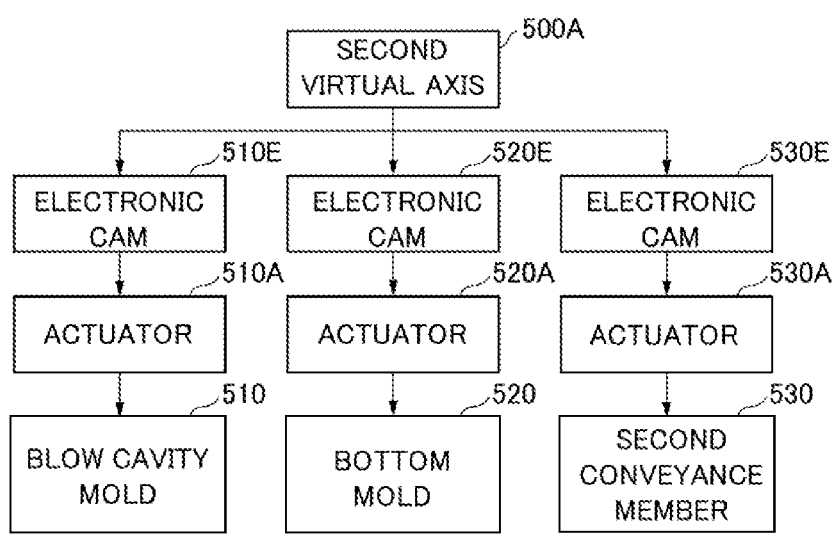
FIG. 9 is a block diagram illustrating electronic cams set in a second driving unit group for driving a blow movable member of the blow molding section.

FIG. 9 is a block diagram illustrating electronic cams set in a second driving unit group for driving the blow cavity mold 510, the bottom mold 520, and the second conveyance member 530 of the blow molding section 500. The blow cavity mold 510, the bottom mold 520, and the second conveyance member 530 are driven by the second driving unit group (the blow driving unit) including actuators 510A, 520A, 530A, respectively. The actuator 510A corresponds to the first blow driving unit, the actuator 520A corresponds to the second blow driving unit, and the actuator 530A corresponds to the third blow driving unit. The actuators 510A, 520A, 530A are, for example, servomotors, air cylinders, hydraulic cylinders, and the like. Electronic cams 510E, 520E, 530E are respectively set for the actuators 510A, 520A, 530A. Each of the electronic cams 510E, 520E, 530E is synchronized with a second virtual axis 500A. The operations of the respective actuators 510A, 520A, 530A are controlled in synchronization with the second virtual axis 500A by the respective electronic cams 510E, 520E, 530E. That is, each of the opening and closing operation of the blow cavity mold 510, the raising and lowering operation of the bottom mold 520, and the conveyance operation of the second conveyance member 530 is controlled in synchronization with the second virtual axis 500A.

The second conveyance member 530 is a chuck member that grips the neck portions (12) of M preforms 10 or M containers 20 and conveys them intermittently. The second conveyance member 530 includes a pair of holding arms 532 that grip the neck portion (12) of the preform 10 or the container 20 (FIG. 7). The second conveyance member 530 integrally includes a carry-in section 534 and a carry-out section 536 and is configured to reciprocate in the front and rear direction. This reciprocating motion is performed by the actuator 530A (e.g., servomotor). With this reciprocating motion, the carry-in section 534 reciprocates between a preform receiving position B1 and a blow molding position B2, and the carry-out section 536 reciprocates between the blow molding position B2 and a take-out position B3. Each of the carry-in section 534 and the carry-out section 536 includes a pair of holding arms 532 for conveying M preforms 10. The pair of holding arms 532 are integrally driven to be opened and closed in the left and right direction by, for example, a driving force of an air cylinder. Further, the row pitch of the pair of holding arms 532 in the carry-in section 534 changes from a narrow pitch at the preform receiving position B1 to a wide pitch at the blow molding position B2 when moving from the preform receiving position B1 to the blow molding position B2.

Subsequently, the operation of conveying the preform 10 and the container 20 and the operation of the conveyance jig 310A in the blow molding machine 1 will be described. First, the process of conveying the injection-molded preform 10 to the conveyance path 300 will be described with reference to FIGS. 1 and 2.

The N preforms 10 injection-molded in the injection molding section 100 are separated from the injection core molds 120 at the receiving position P1 and accommodated in the holding members 152 of the take-out device 150. Subsequently, the holding members 152 are moved to the delivery position P2, and the preforms 10 are held by the preform holders 222 of the preform conveying device 220. Then, the preform holders 222 are moved, and the preforms 10 are delivered from the preform holders 222 to the first reversing pots 212 of the first reversing member 210. Then, the first reversing member 210 is moved downward and then inverted so that the first reversing pots 212 are moved from the upper side to the lower side. The preforms 10 accommodated in the first reversing pots 212 are mounted, separately by M preforms, on three conveyance jigs 310A in the parallel driving device 370 of the conveyance path 300. Through this series of flows, the injection-molded preforms 10 are conveyed to the conveyance path 300. When molding a small preform of about 500 mL, the injection molding time (injection molding cycle) is about 10 seconds. The injection molding time is defined, for example, by the interval of the start times of the operation of closing the mold of the injection molding section 100 in the front and rear batches.

Figure 10:
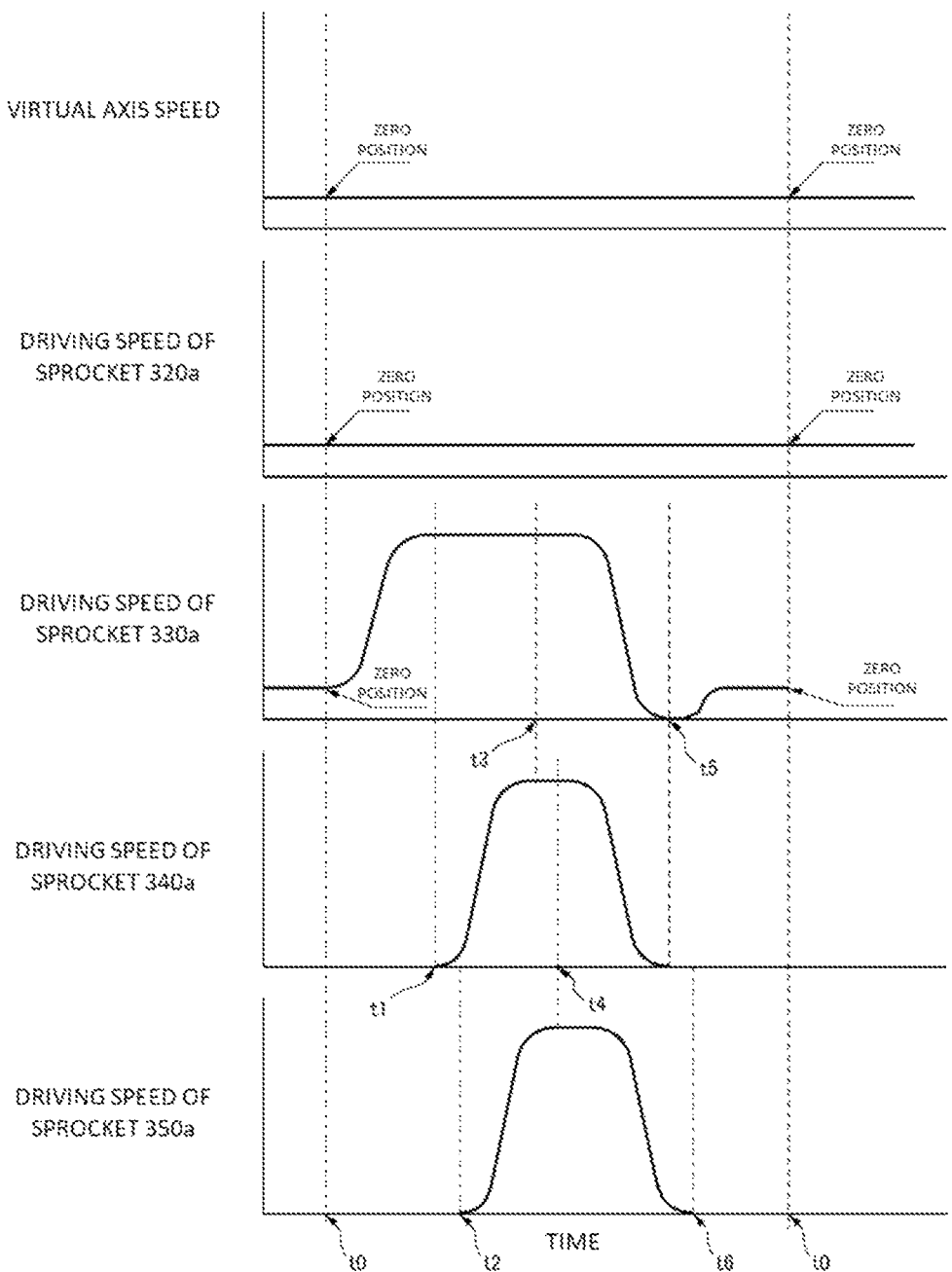
FIG. 10 is a view showing a driving state of a conveyance driving unit in the conveyance path.

Subsequently, the process of conveying the preform 10 in the conveyance path 300 will be described with reference to FIGS. 2, 3, 6 and 10. FIG. 10 is a view showing the driving states of the sprockets 320a, 330a, 340a, 350a in the conveyance path 300.

After the preforms 10 mounted in the conveyance jigs 310A in the previous cycle are conveyed to the left by the carry-out device, one of the sprockets 372a, 372b is rotated by one step, and the preforms 10 mounted in the three conveyance jigs 310A on the parallel driving device 370 are delivered forward by one step. Subsequently, the leading conveyance jig 310A on the parallel driving device 370 is conveyed to the left by the carry-out device and carried out to the conveyance path 300 in the continuous conveyance region T1.

In the continuous conveyance region T1, the plurality of conveyance jigs 310A are continuously conveyed by the driving force of the continuously driven sprockets 320a, 320b, 320c, 320d and the close contact of the front and rear first conveyance members 310 by the ring-shaped member 314. In this process, the preforms 10 are heated while being rotated by the heating section 360. The sprocket 320a is operated at a fixed driving speed by the actuator 320A that is controlled by the electronic cam 320E synchronized with a rotation period (cycle period) of the first virtual axis 300A. Here, the driving speed means the phase speed of the sprocket. Hereinafter, the driving speeds of the sprockets 320a, 330a, 340a, 350a mean the phase speeds of the sprockets.

The conveyance jig 310A in which the preforms 10 are mounted passes through the heating section 360 and engages with the sprocket 330a in the intermittent conveyance region T2. The sprocket 330a is operated by the actuator 330A that is controlled by the electronic cam 330E synchronized with the rotation period of the first virtual axis 300A. At the time when the leading first conveyance member 310 of the conveyance jig 310A is engaged with the sprocket 330a (time t0), the sprocket 330a is operated at the same speed as the driving speed of the sprocket 320a (FIG. 10). The sprocket 330a is accelerated from time t0, and the conveyance jig 310A is driven to be accelerated. This acceleration driving gradually increases the acceleration and gradually decreases the acceleration until the driving speed of the sprocket 320b reaches the maximum speed, so that the driving speed is made to change continuously (FIG. 10). The engagement between the conveyance jig 310A and the sprocket 320a is released at a predetermined period of time before the acceleration driving of the sprocket 330a starts from time t0. That is, at this timing, the conveyance jig 310A moves from the continuous conveyance region T1 to the intermittent conveyance region T2.

After a predetermined time has elapsed, the sprocket 330a is decelerated and the conveyance jig 310A is driven to be decelerated. Finally, at time t5, the driving speed becomes zero (FIG. 10). This deceleration driving gradually decreases the acceleration and gradually increases the acceleration until the driving speed of the sprocket 330a reaches zero, so that the driving speed is made to change continuously (FIG. 10). At time t5, the conveyance jig 310A is disengaged from the sprocket 330a, and engages with the sprocket 340a to become stationary (to be stopped). The conveyance jig 310A is stopped at the second reversing section 400 between the sprocket 330a and the sprocket 340a by the acceleration driving and the deceleration driving of the sprocket 330a. While the conveyance jig 310A is stopped, the preforms 10 mounted in the conveyance jig 310A are corrected from the inverted state to the upright state by the second reversing member and are delivered to the second conveyance member 530 of the blow molding section 500. The time related to the conveyance and stop of the conveyance jig 310A from time t0 to time t5 is, for example, about 3.3 seconds.

Immediately after time t5, the sprocket 330a is accelerated so that the driving speed changes continuously, and the driving speed of the sprocket 330a is matched with the driving speed of the sprocket 320a. After a predetermined time has elapsed, the next conveyance jig 310A, which is continuously conveyed, is driven to be accelerated (time t0).

The sprocket 340a is driven at time t1 after a predetermined time has elapsed since the sprocket 330a is accelerated at time t0, thereby driving the conveyance jig 310A that is stopped at the second reversing section 400 to be accelerated. The acceleration of the sprocket 340a is performed such that the driving speed changes continuously. At time t3, the driving speed of the sprocket 340a is the same as the driving speed of the sprocket 330a. The driving speed of the sprocket 340a is the same as the driving speed of the sprocket 330a from time t3 to time t5 and becomes zero after time t5. The engagement between the conveyance jig 310A and the sprocket 330a is released at a predetermined period of time before the acceleration driving of the sprocket 340a starts from time t1.

Here, the behavior of the conveyance jig 310A in the sprockets 330a, 340a will be described. At time t0, the conveyance jig 310A on the upstream side is moved by the sprocket 330a with respect to the conveyance jig 310A on the downstream side that is stopped at the second reversing section 400, so that the distance between the conveyance jig 310A on the upstream side and the conveyance jig 310A on the downstream side is reduced. At time t1, the conveyance jig 310A on the downstream side is moved by the sprocket 340a before the conveyance jig 310A on the upstream side and the conveyance jig 310A on the downstream side come into contact with each other. At time t3, the driving speed of the sprocket 340a becomes the same as the driving speed of the sprocket 330a, and the distance between the conveyance jig 310A on the upstream side and the conveyance jig 310A on the downstream side is maintained constant. At time t5, each conveyance jig 310A is stopped. In this way, the distance between the conveyance jig 310A on the upstream side and the conveyance jig 310A on the downstream side can be maintained, and the contact between the conveyance jig 310A on the upstream side and the conveyance jig 310A on the downstream side can be prevented.

The sprocket 350a is driven at time t2 after a predetermined time has elapsed since the sprocket 340a is accelerated at time t1. The sprocket 350a is accelerated such that the driving speed changes continuously. At time t4, the driving speed of the sprocket 350a becomes the same as the driving speed of the sprocket 340a. The sprocket 350a is decelerated after a predetermined time has elapsed from time t4, and the driving speed of the sprocket 350a becomes zero at time t6. When the driving speed of the sprocket 350a becomes the same as the driving speed of the sprocket 340a after time t4, the conveyance jig 310A conveyed from the second reversing section 400 by the sprocket 340d is engaged with the sprocket 350a and driven. The conveyance jig 310A engaged with the sprocket 350a is slid into the conveyance rail of the parallel driving device 370 by several intermittent driving. The engagement between the conveyance jig 310A and the sprocket 340a is released at a predetermined period of time before the acceleration driving of the sprocket 350a starts from time t2.

When the leading conveyance jig 310A on the parallel driving device 370 is conveyed to the left by the carry-out device and is carried out to the conveyance path 300 in the continuous conveyance region T1, the conveyance rail is conveyed forward by one step and the next conveyance jig 310A is slid into the conveyance rail of the parallel driving device 370. When the three conveyance jigs 310A are arranged on the parallel driving device 370, the preform 10 is mounted in the conveyance jig 310A again and is sequentially carried out to the conveyance path 300 in the continuous conveyance region T1. By repeating these operations, the conveyance jig 310A circulates in the conveyance path 300.

Further, as shown in FIG. 10, each of the sprockets 330a, 340a, 350a in the intermittent conveyance region T2 has timings (time t3 and time t4) when it is driven at a fixed speed during rotation synchronization.

Figure 11:
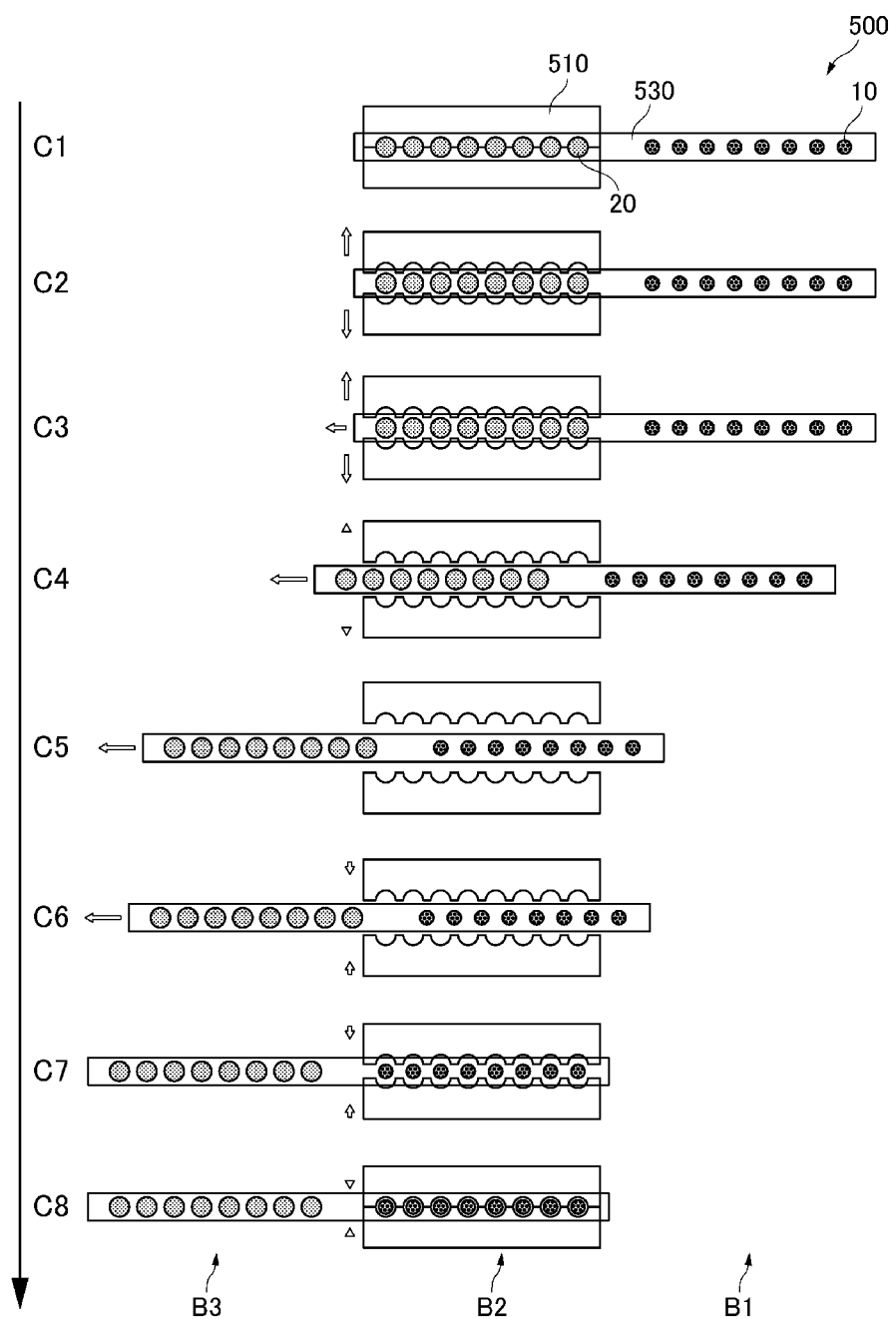
FIG. 11 is a view showing the movement of the blow movable member in the blow molding section.
Figure 12:
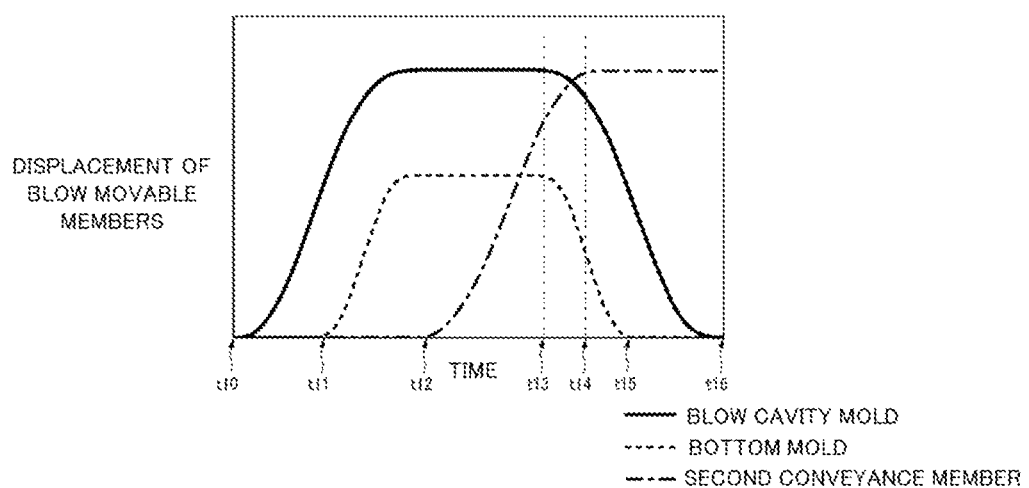
FIG. 12 is a view showing a displacement over time of the blow movable member in the blow molding section.

Subsequently, the process of conveying the preform 10 and the container 20 and the process of molding the container 20 in the blow molding section 500 will be described with reference to FIGS. 7, 8, 9, 11 and 12. FIG. 11 is a view showing the movement of the blow movable member in the blow molding section 500. FIG. 12 is a view showing a displacement over time of the blow movable member in the blow molding section 500. The "displacement" in FIG. 12 means the amount of movement as a scalar, not as a vector. Further, the vertical axis in FIG. 12 has a different scale for each of the blow movable members (each of the blow cavity mold 510, the bottom mold 520, and the second conveyance member 530).

The preform 10 is delivered in the upright state from the conveyance path 300 to the carry-in section 534 of the second conveyance member 530 by the second reversing member of the second reversing section 400. The preform 10 is held in the carry-in section 534 by gripping the neck portion 12 by the pair of holding arms 532. At this time, since the neck portion of the container 20 is gripped by the pair of holding arms 532 of the carry-out section 536, the blow-molded container 20 is held in the carry-out section 536 (C1 in FIG. 11).

Subsequently, the opening operation (mold opening operation) of opening the blow cavity mold 510 is started, and the container 20 is exposed (C2 in FIG. 11 and time t10 in FIG. 12). The blow cavity mold 510 is operated by the actuator 510A that is controlled by the electronic cam 510E synchronized with the rotation period (cycle period) of the second virtual axis 500A. During the opening operation of the blow cavity mold 510, the lowering operation of lowering the bottom mold 520 is started (time t11 in FIG. 12). The bottom mold 520 is operated by the actuator 520A that is controlled by the electronic cam 520E synchronized with the rotation period (cycle period) of the second virtual axis 500A. Each of the split mods of the blow cavity mold 510 may be configured to be operated by two actuators 510A (two electronic cams 510E).

Subsequently, when the blow cavity mold 510 is moved in the left and right direction and the bottom mold 520 is lowered to a position where the container 20 does not interfere with the blow cavity mold 510 and the bottom mold 520 even if the second conveyance member 530 is moved rearward, the rearward movement of the second conveyance member 530 is started (C3 and C4 in FIG. 11 and time t12 in FIG. 12). The second conveyance member 530 is operated by the actuator 530A that is controlled by the electronic cam 530E synchronized with the rotation period of the second virtual axis 500A. In the relationship between time and displacement of the blow cavity mold 510 and the second conveyance member 530 shown in FIG. 12, the movement of the second conveyance member 530 is started after the blow cavity mold 510 is completely opened (time t12). However, as shown in C3 in FIG. 11, the movement of the second conveyance member 530 may be started before the blow cavity mold 510 is completely opened. Further, the movement of the second conveyance member 530 may be started before the bottom mold 520 is completely lowered. The second conveyance member 530 may be configured to be operated by two actuator 530A (two electronic cams 530E) for back and forth movement and for pitch conversion.

As the second conveyance member 530 is moved rearward, the preform 10 in the carry-in section 534 is conveyed from the preform receiving position B1 to the blow molding position B2, and the container 20 in the carry-out section 536 is conveyed to the blow molding position B2 and the take-out position B3 (FIGS. 7 and C5 in FIG. 11). When the second conveyance member 530 is moved to a position where the preform 10 does not interfere with the blow cavity mold 510 even if the closing operation (mold closing operation) of closing the blow cavity mold 510 is started while the preform 10 is conveyed from the preform receiving position B1 to the blow molding position B2, the closing operation of the blow cavity mold 510 is started (C6 in FIG. 11 and time t13 in FIG. 12). When the conveyance of the preform 10 from the preform receiving position B1 to the blow molding position B2 is completed (C7 in FIG. 11 and time t14 in FIG. 12), the blow cavity mold 510 is closed and the preform 10 is fixed (C8 in FIG. 11 and time t16 in FIG. 12), and then, the blow molding of the container 20 is started.

When the preform 10 is fixed by the blow cavity mold 510, the preform 10 is released from the second conveyance member 530. The lifting operation of the bottom mold 520 is started so that the blow cavity mold 510 is opened when the lifting of the bottom mold 520 is completed (time t15 in FIG. 12). The container 20 conveyed from the blow molding position B2 to the take-out position B3 is released and collected from the second conveyance member 530. The second conveyance member 530, from which the preform 10 and the container 20 are released, is moved forward, and holds and conveys the preform 10 and the container 20 in the next cycle. By repeating these operations, the preform 10 and the container 20 are conveyed in the blow molding section 500.

Figure 13:
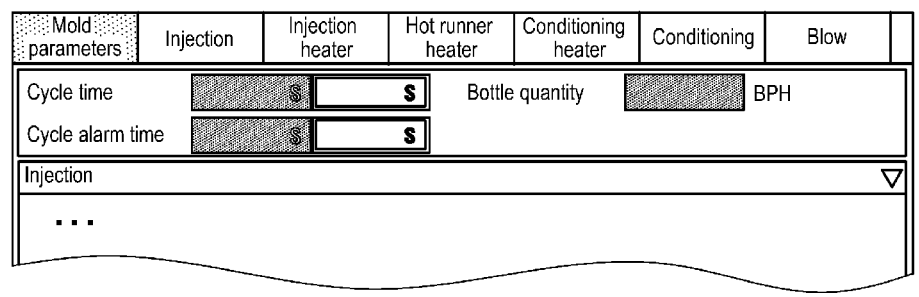
FIG. 13 is a view showing an example of a GUI included in the blow molding machine.
Figure 14:
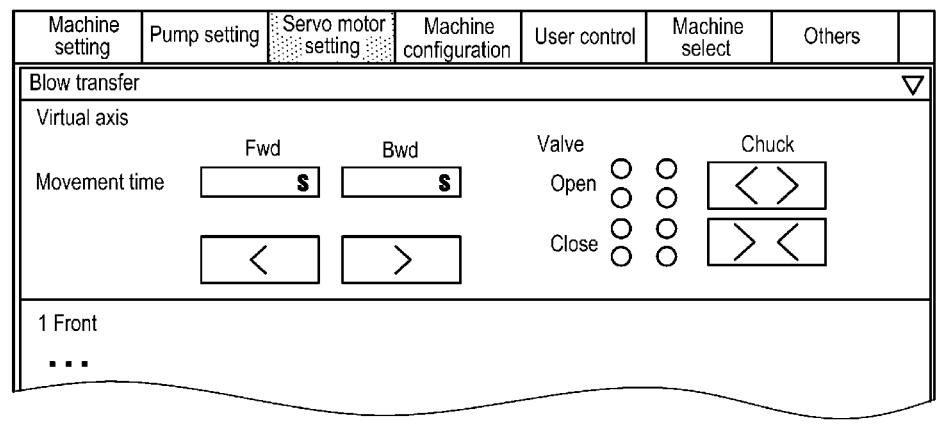
FIG. 14 is a view showing another example of a GUI included in the blow molding machine.

Further, the blow molding machine 1 includes a graphical user interface (GUI) for setting the operation of the blow molding machine 1, as shown in FIGS. 13 and 14. An operator can display various setting screens by selecting various taps ("Mold parameters" and "Injection" in FIG. 13, and "Machine setting" and "Servo motor setting" in FIG. 14) displayed on the GUI, and can set the operation of the blow molding machine 1 by setting various parameters on the various setting screens. FIG. 13 shows a state in which the "Mold parameters" tab is selected, and FIG. 14 shows a state in which the "Servo motor setting" tab is selected. Further, an icon (not shown) for switching the display from FIG. 13 to FIG. 14, that is, switching the display of the tab itself is also displayed on the GUI.

The parameters displayed on the GUI include a key parameter that can change the operations of a plurality of corresponding driving units at once by changing the value of the key parameter. For example, in order to set the operations of the actuators 320A, 330A, 340A, 350A in the conveyance path 300, one parameter called "Cycle time (corresponding to the injection molding time described above)" shown in FIG. 13 is changed, and thus, each synchronized operation time (horizontal axis length (time length) of the electronic cam curve of the first driving unit group) of the first driving unit group is automatically changed at once. Further, for example, in order to set the operations of the actuators 510A, 520A, 530A in the blow molding section 500, "Movement time" in "Virtual axis (corresponding to the second virtual axis 500A)" shown in FIG. 14 is changed, and thus, each synchronized operation time (horizontal axis length (time length) of the electronic cam curve of the second driving unit group) of the second driving unit group is automatically changed at once.

In the 1.5-step type blow molding machine that is a kind of a hot parison type (1-step type) blow molding machine, as a result of pursuing improvements in productivity and versatility in space-saving, a large number of movable parts (a transfer table for the conveyance section, and a mold and a transfer chuck for the blow molding section) and a large number of drive parts (motors, etc.) dedicated to the movable parts are provided. When a mechanical control method (method using a mechanical cam or a timing belt) is adopted as in the prior art for improvements such as expansion of versatility (expansion of the size of the container that can be produced) and improvement in productivity (shortening of the cycle), works involved in adjusting an equipment and replacing mechanical parts increase, which increases the burden on the operator. Further, in order to achieve the above improvements, for example, in the conveyance section, it is necessary to perform an appropriate position and speed control for different transfer tables according to the number of cavities, and, in the blow molding section, it is necessary to appropriately adjust the mold opening and closing stroke and speed according to the size of the final molded product. It has been difficult to carry out such precise and stable operation control with a mechanical control method.

In the blow molding machine 1 according to the above embodiment, the sprockets 320a, 330a, 340a, 350a (a plurality of conveyance driving units) that drives the first conveyance member 310 of the conveyance path 300 are controlled in synchronization with each other by the actuators 320A, 330A, 340A, 350A (the first driving unit group) (FIG. 6), and the operations of the blow cavity mold 510, the bottom mold 520, and the second conveyance member 530 (the blow movable members) of the blow molding section 500 are controlled in synchronization with each other by the actuators 510A, 520A, 530A (the second driving unit group) (FIG. 9). Since the operations of the conveyance driving unit and the blow movable member are controlled in synchronization with each other by the first driving unit group and the second driving unit group, respectively, the operation of the movable member can be easily optimized to be stable and shortest. Further, even when changing the cycle time due to the change in the number of containers taken, the mechanical adjustment work for each driving unit becomes unnecessary, and the work time can be shortened. In this way, a short molding cycle can be achieved, and it is possible to easily manufacture containers having various sizes. Further, since a stable operation can be achieved, the mechanical load can be also reduced.

Further, in the blow molding machine 1 according to the above embodiment, the second conveyance driving unit 330 initially drives the first conveyance member 310 in a state of being driven at the same speed as the driving speed of the first conveyance driving unit 320 (time t0 in FIG. 10), and then, is accelerated to drive the first conveyance member 310 to be accelerated. With this configuration, the first conveyance member 310 can be smoothly driven from the first conveyance driving unit 320 to the second conveyance driving unit 330, and vibration due to the operation of the first conveyance member 310 and collision between the first conveyance members 310 can be prevented. In this way, a stable operation can be achieved, and the mechanical load can be also reduced.

Further, in the blow molding machine 1 according to the above embodiment, the third conveyance driving unit 340 is driven after the second conveyance driving unit 330 is accelerated from a fixed driving speed (time t1 in FIG. 10), is driven at the same speed as the driving speed of the second conveyance driving unit 330 from the time when the driving speed of the third conveyance driving unit 340 is accelerated to the driving speed of the second conveyance driving unit 330 (time t3 in FIG. 10), and is driven to stop at the time when the driving speed of the second conveyance driving unit 330 becomes zero (time t5 in FIG. 10). With this configuration, the first conveyance member 310 can be smoothly driven from the second conveyance driving unit 330 to the third conveyance driving unit 340, and vibration due to the operation of the first conveyance member 310 and collision between the first conveyance members 310 can be prevented. In this way, since a stable operation can be achieved, the mechanical load can be also reduced.

Further, in the blow molding machine 1 according to the above embodiment, during a first conveyance operation of conveying the preform 10 to the blow cavity mold 510 by the second conveyance member 530, a first opening and closing operation of closing the blow cavity mold 510 is performed in the blow molding section 500 (FIG. 11 and time t13 in FIG. 12). With this configuration, the cycle time of the blow molding can be shortened. Furthermore, in a certain cycle time when a certain number of preforms 10 are conveyed to the blow molding section 500, the moving speed of the blow cavity mold 510 alone can be made slower as compared with the case where the blow cavity mold 510 and the second conveyance member 530 are independently moved. Since the operation of the blow cavity mold 510, which is one of the blow movable members, can be slowed down even during a short cycle time, a stable operation can be achieved while shortening the molding cycle, and the mechanical load can be also reduced.

Further, in the control for operating the blow molding machine 1 according to the above embodiment, the sprockets 330a, 340a (a plurality of conveyance driving units) that drives the first conveyance member 310 (the conveyance movable member) in the conveyance path 300 are controlled in synchronization with each other, and the actuators 510A, 520A, 530A (a plurality of blow driving units) that drives the blow cavity mold 510, the bottom mold 520 and the second conveyance member 530 (a plurality of blow movable members) in the blow molding section 500 are controlled in synchronization with each other (FIGS. 6 and 9). Since the operations of the conveyance driving unit and the blow driving unit are controlled in synchronization with each other, the operations of the conveyance movable member and the blow movable member can be easily optimized to be stable and shortest. Further, even when changing the cycle time due to the change in the number of containers taken, the mechanical adjustment work for each driving unit becomes unnecessary, and the work time can be shortened. In this way, a short molding cycle can be achieved, and it is possible to easily manufacture containers having various sizes. Further, since a stable operation can be achieved, the mechanical load can be also reduced.

Further, in the control for operating the blow molding machine 1 according to the above embodiment, at least the sprocket 330a (the second conveyance driving unit 330) and the sprocket 340a (the third conveyance driving unit 340) are driven in synchronization with each other (FIG. 10). The first conveyance member 310 on the upstream side is moved with respect to the first conveyance member 310 on the downstream side that is stopped at the second reversing section 400 (an example of the transfer section), and the distance between the first conveyance member 310 on the upstream side and the first conveyance member 310 on the downstream side is reduced (time t0 in FIG. 10). Furthermore, the first conveyance member on the downstream side is moved before the first conveyance member on the upstream side and the first conveyance member on the downstream side come into contact with each other (time t1 in FIG. 10), and the distance between the first conveyance member on the upstream side and the first conveyance member on the downstream side is maintained. By adopting such control, the collision of the first conveyance members 310 can be prevented. In this way, a stable operation can be achieved, and the mechanical load can be reduced. In particular, the conveyance distance between the sprocket 330a and the sprocket 340a is smaller than the conveyance distance between the sprocket 340a and the sprocket 350a. When the conveyance speed of the conveyance jig 310A is increased in order to improve the molding cycle, two conveyance jigs 310A are likely to collide with each other in the conventional method in which the rotations are not synchronized. A slight misalignment of the conveyance jig 310A may be occurred due to such collision, and the preform 10 in the conveyance jig 310A may not be smoothly transferred to the second reversing section 400 (the second reversing member). With the above-described control, the transfer of the preform 10 between the conveyance jig 310A and the second reversing section 400 can be reliably performed.

Further, in the control for operating the blow molding machine 1 according to the above embodiment, at least the actuators 510A, 520A, 530A (respectively corresponding to the first blow driving unit, the second blow driving unit, and the third blow driving unit) are driven in synchronization with each other (FIGS. 9 and 12). The opening and closing operation of closing the blow cavity mold 510 is performed during the conveyance operation of conveying the preform 10 to the blow cavity mold 510 by the second conveyance member 530 (FIG. 11 and time t13 in FIG. 12). By adopting such control, the cycle time of the blow molding can be shortened. Furthermore, in a certain cycle time when a certain number of preforms 10 are conveyed to the blow molding section 500, the moving speed of the blow cavity mold 510 alone can be made slower as compared with the case where the blow cavity mold 510 and the second conveyance member 530 are independently moved. Since the operation of the blow cavity mold 510, which is one of the blow movable members, can be slowed down even during a short cycle time, a stable operation can be achieved while shortening the molding cycle, and the mechanical load can be also reduced.

The invention is not limited to the above-described embodiments and can be freely modified and improved as appropriate. In addition, materials, shapes, dimensions, numerical values, forms, numbers, and locations and the like of each component in the above-described embodiments are arbitrary and not limited, so long as the invention can be achieved.

For example, although the injection molding section 100 that molds a total of 24 preforms 10 in 3 rows with 8 preforms for each row, and the conveyance jig 310A in which the eight first conveyance members 310 are connected have been described in the above embodiment, the number of the preforms that are injection-molded at once and the number of the first conveyance members 310 that are connected are not limited in the present invention. By changing the mold of the injection molding section 100, the number of preforms taken may be set to a total of 12 in 3 rows with 4 preforms for each row, a total of 18 in 3 rows with 6 preforms for each row, and a total of 36 in 3 rows with 12 preforms for each row, for example. For the conveyance jig, the number of the first conveyance members connected to each other according to the number of the preforms in each row may be changed, and some of the first conveyance members may be driven without mounting the preform. Here, according to the blow molding machine 1 of the above embodiment in which the electronic cams are set, even when the number of the preforms is changed in this way, the operation of the conveyance driving unit of the conveyance path 300 can be easily optimized, so that the work time can be suitably shortened.

This application is based upon Japanese Patent Application (Patent Application No. 2018-185053) filed on Sep. 28, 2018, the entire contents of which are incorporated herein by reference. Further, all references cited herein are incorporated in their entirety.

REFERENCE SIGNS LIST

1: Blow molding machine,
10: Preform
20: Container
300: Conveyance path
310: First conveyance member
320: First conveyance driving unit
330: Second conveyance driving unit
340: Third conveyance driving unit
350: Fourth conveyance driving unit
360: Heating section
500: Blow molding section
510: Blow cavity mold
520: Bottom mold
530: Second conveyance member

The invention claimed is:

1. A blow molding machine for a resin container, the blow molding machine comprising at least:
   a blow molding section;
   a heating section; and
   a conveyance path for conveying a preform heated in the heating section to the blow molding section,
   wherein the conveyance path comprises:
      a conveyance movable member configured to continuously and intermittently be driven;
      a plurality of conveyance driving units configured to drive the conveyance movable member; and
      a first driving unit group,
   wherein the blow molding section comprises:
      a plurality of blow movable members; and
      a second driving unit group,
   wherein the plurality of conveyance driving units in the conveyance path are configured to be driven in synchronization with each other by the first driving unit group,
   wherein the blow movable members in the blow molding section are configured to be driven in synchronization with each other by the second driving unit group,
   wherein the first driving unit group and the second driving unit group each comprise a plurality of servomotors,
   wherein the first driving unit group is configured to be controlled by an electronic cam synchronized with a first virtual axis, and
   wherein the second driving unit group is configured to be controlled by an electronic cam synchronized with a second virtual axis.

2. The blow molding machine according to claim 1,
   wherein the conveyance movable member is a first conveyance member configured to support the preform,
   wherein the plurality of conveyance driving units comprises at least:
      a first conveyance driving unit configured to continuously drive the first conveyance member, and
      a second conveyance driving unit and a third conveyance driving unit configured to intermittently drive the first conveyance member,
   wherein the first conveyance member in the conveyance path is configured to be driven and conveyed by the first conveyance driving unit, the second conveyance driving unit and the third conveyance driving unit in this order, and
   wherein the first conveyance driving unit, the second conveyance driving unit and the third conveyance driving unit are configured to be controlled in synchronization with each other.

3. The blow molding machine according to claim 2,
   wherein the second conveyance driving unit and the third conveyance driving unit each are configured to be driven to maintain continuity of speed.

4. The blow molding machine according to claim 2,
   wherein the second conveyance driving unit is configured to initially drive the first conveyance member in a state of being driven at the same speed as a driving speed of the first conveyance driving unit, and then, to be accelerated to drive the first conveyance member to be accelerated.

5. The blow molding machine according to claim 2,
   wherein the third conveyance driving unit is configured to be driven after the second conveyance driving unit is accelerated from a fixed driving speed, configured to be driven at the same speed as a driving speed of the second conveyance driving unit from a time when a driving speed of the third conveyance driving unit is accelerated to the driving speed of the second conveyance driving unit, and configured to be driven to stop at a time when the driving speed of the second conveyance driving unit becomes zero.

6. The blow molding machine according to claim 1,
   wherein the blow movable members comprise at least a blow cavity mold that is a split mold, a bottom mold, and a second conveyance member for conveying the preform and the container, and
   wherein an opening and closing operation of the blow cavity mold and a conveyance operation of the second conveyance member are configured to be controlled in synchronization with each other.

7. The blow molding machine according to claim 6,
   wherein, during a first conveyance operation of conveying the preform to the blow cavity mold by the second conveyance member, a first opening and closing operation of closing the blow cavity mold is performed.

8. The blow molding machine according to claim 6,
   wherein, during a second opening and closing operation of opening the blow cavity mold, a second conveyance operation of conveying the container from the blow cavity mold to an outside of the blow cavity mold by the second conveyance member is performed.

9. A method for controlling a blow molding machine for a resin container, the blow molding machine comprising at least: a blow molding section; a heating section; and a conveyance path for conveying a preform heated in the heating section to the blow molding section, the method comprising:
   controlling a plurality of conveyance driving units in synchronization with each other, the conveyance driving units driving a conveyance movable member in the conveyance path; and
   controlling a plurality of blow driving units in synchronization with each other, the blow driving units driving a plurality of blow movable members in the blow molding section,
   wherein the plurality of conveyance driving units in the conveyance path are configured to be driven in synchronization with each other by a first driving unit group,
   wherein the plurality of blow driving units are configured to be driven in synchronization with each other by a second driving unit group,
   wherein the first driving unit group and the second driving unit group each comprise a plurality of servomotors,
   wherein the first driving unit group is configured to be controlled by an electronic cam synchronized with a first virtual axis, and
   wherein the second driving unit group is configured to be controlled by an electronic cam synchronized with a second virtual axis.

10. A method for controlling a blow molding machine for a resin container, the blow molding machine comprising at least: a blow molding section; a heating section; a conveyance path for conveying a preform heated in the heating section to the blow molding section; and a driving unit,
    wherein the conveyance path is formed in a loop shape having a continuous conveyance region and an intermittent conveyance region, and comprises a plurality of conveyance movable members,
    wherein at least one of the plurality of conveyance movable members is a first conveyance member at an upstream side configured to support the preform and at least one of the plurality of conveyance movable members is a first conveyance member at a downstream side configured to support the preform, wherein the driving unit comprises at least: a first conveyance driving unit provided in the continuous conveyance region and continuously driving the first conveyance member at the upstream side; and a second conveyance driving unit and a third conveyance driving unit provided in the intermittent conveyance region and intermittently driving the first conveyance member at the downstream side, and wherein a transfer section for transferring the preform mounted in the first conveyance member at the downstream side that is stopped to the blow molding section is provided in the conveyance path between the second conveyance driving unit and the third conveyance driving unit, the method comprising:

driving at least the second conveyance driving unit and the third conveyance driving unit in synchronization with each other;

moving the first conveyance member on the upstream side with respect to the first conveyance member on the downstream side which is stopped at the transfer section to reduce a distance between the first conveyance member on the upstream side and the first conveyance member on the downstream side; and moving the first conveyance member on the downstream side before the first conveyance member on the upstream side and the first conveyance member on the downstream side come into contact with each other to maintain the distance between the first conveyance member on the upstream side and the first conveyance member on the downstream side.

11. A method for controlling a blow molding machine for a resin container, the blow molding machine comprising at least: a blow molding section; a heating section; a conveyance path for conveying a preform heated in the heating section to the blow molding section; and a driving unit, wherein the blow molding section comprises a plurality of blow movable members, wherein the blow movable members comprise at least: a blow cavity mold that is a split mold; a bottom mold; and a second conveyance member for conveying the preform and the container, and wherein the driving unit comprises: a first blow driving unit opening and closing the blow cavity mold; a second blow driving unit raising and lowering the bottom mold; and a third blow driving unit moving the second conveyance member, the method comprising:

driving at least the first blow driving unit, the second blow driving unit, and the third blow driving unit in synchronization with each other, and performing an opening and closing operation of closing the blow cavity mold during a conveyance operation of conveying the preform to the blow cavity mold by the second conveyance member, wherein a plurality of conveyance driving units in the conveyance path are configured to be driven in synchronization with each other by a first driving unit group, wherein the first blow driving unit, the second blow driving unit, and the third blow driving unit are configured to be driven in synchronization with each other by a second driving unit group, wherein the first driving unit group and the second driving unit group each comprise a plurality of servomotors, wherein the first driving unit group is configured to be controlled by an electronic cam synchronized with a first virtual axis, and wherein the second driving unit group is configured to be controlled by an electronic cam synchronized with a second virtual axis.

* * * * *